June 7, 1938.  C. M. NORDENSTAM  2,119,828
FISHTRAP
Filed May 24, 1937   2 Sheets-Sheet 1
Fig. 1.
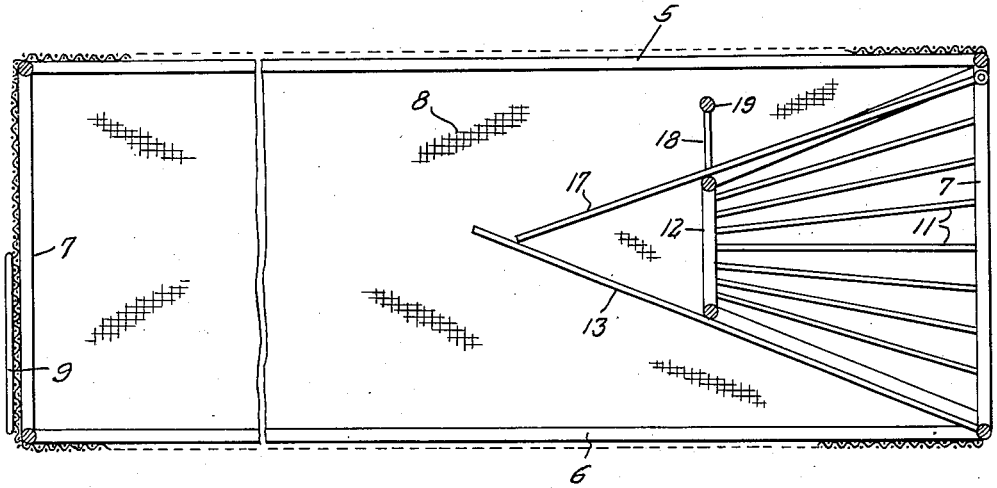
Fig. 2.
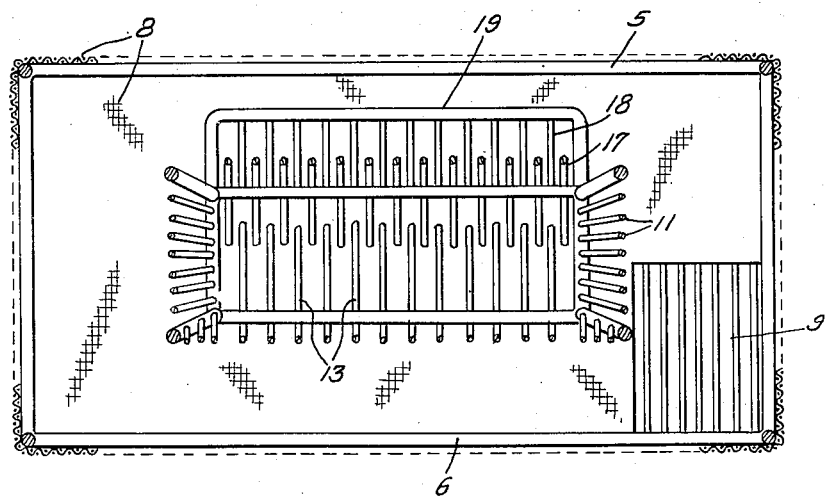
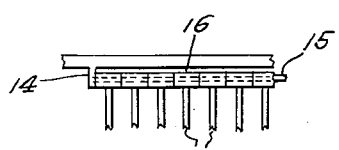
Fig. 6.
Inventor
Carl M. Nordenstam,
By Clarence A. O'Brien
Hyman Berman
Attorneys June 7, 1938.  C. M. NORDENSTAM  2,119,828
FISHTRAP
Filed May 24, 1937  2 Sheets-Sheet 2

Inventor
Carl M. Nordenstam,

By Clarence A. O'Brien
Hyman Berman
Attorneys

Patented June 7, 1938

2,119,828

UNITED STATES PATENT OFFICE 2,119,828

FISHTRAP

Carl M. Nordenstam, Bertrand, Nebr.

Application May 24, 1937, Serial No. 144,488

2 Claims. (Cl. 43—100)

This invention appertains to new and useful improvements in the general art of fishing and trapping, and more particularly to a fishtrap.

The principal object of the present invention is to provide a trap which can be placed in the water, and in which fish can be trapped in an efficient manner.

Another important object of the invention is to provide a fishtrap which can be easily inspected, and which is substantially foolproof in operation.

Another important object of the invention is to provide a fishtrap which can be easily repaired in the event of damage and which is of simple construction.

These and various other important objects and advantages of the invention will become apparent to the reader of the following specification.

In the drawings,

Figure 1 represents a longitudinal sectional view through the trap.

Figure 2 is a transverse vertical sectional view.

Figure 6 is a fragmentary elevational view of the swingable bars.

Figure 3:
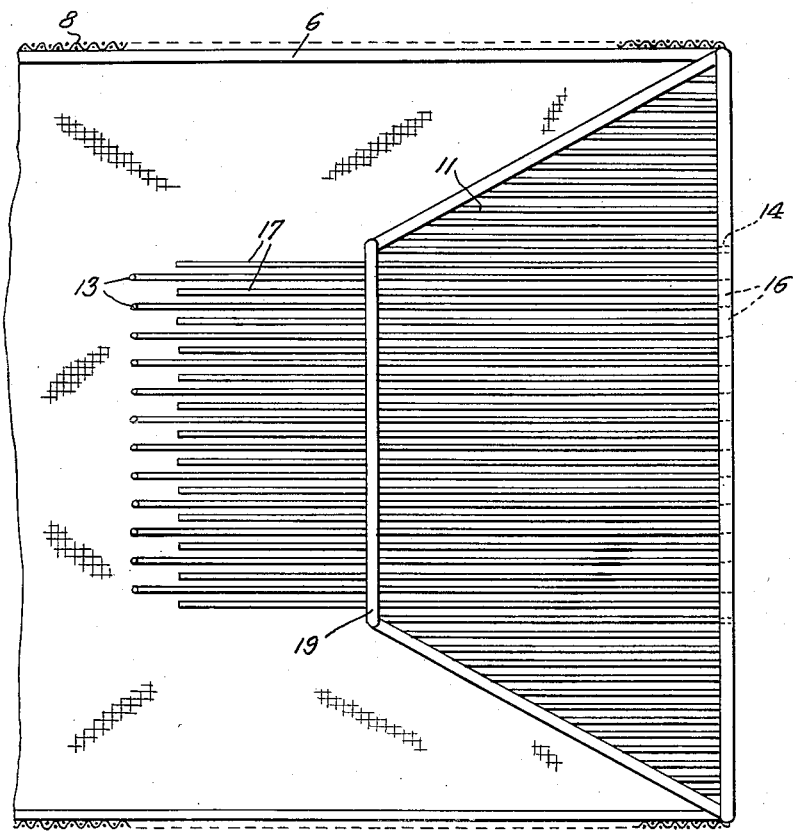
Figure 3 is a fragmentary horizontal sectional view.
Figure 4:
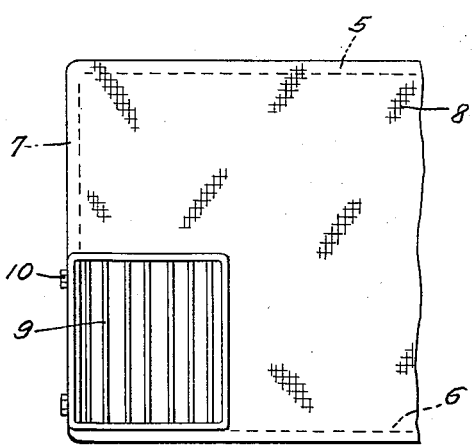
Figure 4 is a fragmentary rear end elevational view.
Figure 5:
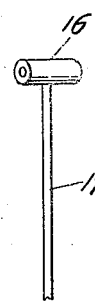
Figure 5 is a fragmentary perspective view of one of the swingable bars.

Referring to the drawings, wherein like numerals designate like parts, it can be seen that the trap consists of the upper rectangular frame 5 and the lower rectangular frame 6, these frames being connected by the corner posts 7.

The top, bottom, sides, and one end of the structure are covered with a suitable mesh sheeting 8, and the closed end of the trap has an opening therein which is normally closed by the door 9, of grille construction, and hingedly connected to one of the posts 7, as at 10.

The opposite end of the trap is open, and extending inwardly from the posts 7 and adjacent ends of the frames 5—6, in converging relation, are the rods 11, defining a guideway. These rods 11 connect at their inner ends to the rectangular shaped frame 12.

Elongated members 13 extend from the entrance end of the frame 6 inwardly in an inclined position and are preferably spot welded or otherwise secured to the lower portion of the frame 12. These elongated members 13 extend substantially inwardly beyond the frame 12.

As is shown in Figure 6, the entrance end of the frame 5 is provided with depending ears 14 between which the rod 15 is interposed. This rod extends through the barrel-like ends 16 of the swingable elongated members 17 which extend between the guide members 18 which rise from the top of the frame 12. These elongated members 17 are somewhat shorter and terminate short of the inner ends of the elongated members 13.

The upper ends of the guide members 18 are secured to the framepiece 19 as clearly shown in Figure 2.

It can now be seen that the rods 11 define an inwardly converging guideway into which fish can swim to reach bait placed in the trap.

The fish are guided upwardly by the inward extensions of the elongated members 13 and rise upwardly against the elongated members 17 which yield upwardly permitting the fish to enter the trap proper, after which these elongated members 17 settle downwardly and prevent return of the fish.

While the foregoing specification sets forth the invention in specific terms, it can be understood that numerous changes in the shape, size, and arrangements may be resorted to without departing from the scope of the invention as claimed hereinafter.

Having thus described the invention, what is claimed as new is:

1. A trap comprising an entrance structure, a rigid guide structure extending inwardly from the lower portion of the entrance structure, and a swingable guide structure extending inwardly from the upper portion of the entrance structure and terminating adjacent the rigid guide structure inwardly of its free edge, said entrance structure being further provided with an inwardly extending and converging funnel-like structure, said funnel-like structure being constructed of a plurality of elongated members, the rigid guide structure being constructed of a plurality of elongated members certain portions of which comprise the elongated members at the lower portion of the funnel-like structure.

2. A trap comprising an entrance structure, a rigid guide structure extending inwardly from the lower portion of the entrance structure, a swingable guide structure extending inwardly from the upper portion of the entrance structure and terminating adjacent the rigid guide structure inwardly of its free edge, said entrance structure being further provided with an inwardly extending and converging funnel-like structure, said funnel-like structure being constructed of a plurality of elongated members, the rigid guide structure being constructed of a plurality of elongated members certain portions of which comprise the elongated members at the lower portion of the funnel-like structure, said funnel-like structure being provided with a frame-like member at its inner end and guide means rising from the said frame for guiding the said swingable guide structure.

CARL M. NORDENSTAM.